(12) United States Patent
Gionis et al.

(10) Patent No.: US 8,660,975 B2
(45) Date of Patent: Feb. 25, 2014

(54) SYSTEM AND METHOD OF MATCHING CONTENT ITEMS AND CONSUMERS

(75) Inventors: Aristides Gionis, Barcelona (ES); Gianmarco De Francisci Morales, Sicily (IT); Mauro Sozio, Paris (FR)

(73) Assignee: Yahoo! Inc., Sunnyvale, CA (US)

( * ) Notice: Subject to any disclaimer, the term of this patent is extended or adjusted under 35 U.S.C. 154(b) by 286 days.

(21) Appl. No.: 13/313,775

(22) Filed: Dec. 7, 2011

(65) Prior Publication Data

US 2013/0151456 A1    Jun. 13, 2013

(51) Int. Cl.
*G06F 17/00* (2006.01)
*G06N 5/02* (2006.01)

(52) U.S. Cl.
USPC ............................................................ 706/47

(58) Field of Classification Search
USPC ................................................................ 706/47
See application file for complete search history.

(56) References Cited

U.S. PATENT DOCUMENTS

| | | | |
|---|---|---|---|
| 7,080,314 B1 * | 7/2006 | Garofalakis et al. | 715/236 |
| 7,890,488 B2 * | 2/2011 | Baeza-Yates et al. | 707/706 |
| 7,945,565 B2 * | 5/2011 | Poblete et al. | 707/722 |
| 8,095,545 B2 * | 1/2012 | Telloli et al. | 707/750 |
| 8,204,904 B2 * | 6/2012 | Bonchi et al. | 707/776 |
| 8,346,686 B2 * | 1/2013 | Gionis et al. | 706/12 |

OTHER PUBLICATIONS

E. Agichtein, C. Castillo, D. Donato, A. Gionis, and G. Mishne. Finding high-quality content in social media. In WSDM, pp. 183-194, 2008.

R. Baraglia, G. De Francisci Morales, and C. Lucchese. Document similarity self-join with mapreduce. In ICDM, pp. 731-736, 2010.

D. Charles, M. Chickering, N. R. Devanur, K. Jain, and M. Sanghi. Fast algorithms for finding matchings in lopsided bipartite graphs with applications to display ads. In EC, pp. 121-128, 2010.

F. Chierichetti, R. Kumar, and A. Tomkins. Max-cover in map-reduce. In WWW, pp. 231-240, 2010.

P. Christiano, J. A. Kelner, A. Madry, D. A. Spielman, and S.-H. Teng. Electrical flows, laplacian systems, and faster approximation of maximum flow in undirected graphs. CoRR, arXiv:1010.2921v2, 2010.

C.-T. Chu, S. K. Kim, Y.-A. Lin, Y. Yu, G. R. Bradski, A. Y. Ng, and K. Olukotun. Map-reduce for machine learning on multicore. In NIPS, pp. 281-288, 2006.

J. Cohen. Graph twiddling in a MapReduce world. Computing in Science and Engineering, 11(4):29-41, 2009.

J. Dean and S. Ghemawat. Mapreduce: simplified data processing on large clusters. CACM, 51(1):107-113, 2008.

T. Fischer, A. Goldberg, D. Haglin, and S. Plotkin. Approximating matchings in parallel. IPL, 46(3):115-118, 1993.

(Continued)

*Primary Examiner* — Michael B Holmes
(74) *Attorney, Agent, or Firm* — James J. DeCarlo; Greenberg Traurig, LLP

(57) ABSTRACT

A matching between content items and consumers is discloses. More particularly, items and consumers are matched using a matching approach that uses capacity constraints associated with each consumer, capacity constraints associated with each item, and relationship weights, each relationship weight representing a similarity between a consumer and an item. Edges representing the relationships between consumers and items can be selected using an iterative selection that includes a matching approach that permits capacity constraints. Alternatively, edges can be selected using an iterative approach that allows a solution to be identified prior to completion of the selection processing.

21 Claims, 8 Drawing Sheets

(56) References Cited

OTHER PUBLICATIONS

H. Gabow. An efficient reduction technique for degree-constrained subgraph and bidirected network flow problems. In STOC, pp. 448-456, 1983.

N. Garg, T. Kavitha, A. Kumar, K. Mehlhorn, and J. Mestre. Assigning papers to referees. Algorithmica, 58(1):119-136, 2010.

O. Garrido, S. Jarominek, A. Lingas, and W. Rytter. A simple randomized parallel algorithm for maximal f-matchings. IPL, 57(2):83-87, 1996.

A. V. Goldberg and S. Rao. Beyond the flow decomposition barrier. JACM, 45(5):783-797, 1998.

T. Jebara and V. Shchogolev. B-matching for spectral clustering. In ECML, pp. 679-686, 2006.

T. Jebara, J. Wang, and S. Chang. Graph construction and b-matching for semi-supervised learning. In ICML, pp. 441-448, 2009.

U. Kang, C. Tsourakakis, and C. Faloutsos. PEGASUS: A peta-scale graph mining system implementation and observations. In ICDM, pp. 229-238, 2009.

H. J. Karloff, S. Suri, and S. Vassilvitskii. A model of computation for MapReduce. In SODA, pp. 938-948, 2010.

C. Koufogiannakis and N. Young. Distributed fractional packing and maximum weighted b-matching via tail-recursive duality. In DISC, pp. 221-238, 2009.

J. Lin and C. Dyer. Data-intensive text processing with MapReduce. Morgan & Claypool Publishers, 2010.

Z. Lotker, B. Patt-Shamir, and S. Pettie. Improved distributed approximate matching. In SPAA, pp. 129-136, 2008.

A. Panconesi and M. Sozio. Fast primal-dual distributed algorithms for scheduling and matching problems. Distributed Computing, 22(4):269-283, 2010.

M. Penn and M. Tennenholtz. Constrained multi-object auctions and b-matching. IPL, 75(1-2):29-34, 2000.

M. Wattenhofer and R. Wattenhofer. Distributed weighted matching. In DISC, pp. 335-348, 2004.

Vazirani, Vijay V. "Approximation Algorithms", Library of Congress Cataloging-in-Publication Data; Springer; 2001, Corrected Second Printing 2003; Germany.

\* cited by examiner

```
 1:  /*Pushing Stage */
 2:  while E is non empty do
 3:      Compute a maximal [εb]-matching M (each vertex v
         has capacity [εb(v)]), using an iterative probabilistic approach;
 4:      Push all edges of M on the distributed stack (M becomes
         a layer of the stack);
 5:      for all e ∈ M in parallel do
 6:          Let δ(e) = (w(e) - y_u/b(u) - y_v/(b(v))/2
 7:          increase y_u and y_v by δ(e)
 8:      end for
 9:      Update E by eliminating all edges that have become weakly covered
10:  end while
11:  /* Popping Stage */
12:  while the distributed stack is nonempty do
13:      Pop a layer M out of the distributed stack
14:      In parallel include all edges of M in the solution
15:      For each vertex v: let $\bar{b}(v)$ be the set of edges in M that are incident
         to v; update b(v) ← b(v) - $\bar{b}(v)$;
         if b(v) ≤ 0, then remove all edges incident to v.
16:  end while
```

PUSH: lines 1–8
UPDATE: line 9
POP: lines 11–15

FIGURE 3

1: while $E$ is non empty do
2:   for all $v \in V$ in parallel do
3:     Let $\hat{L}_v$ be the set of $b(v)$ edges incident to $v$ with maximum weight;
4:     Let $F$ be $\hat{L}_v \cap \hat{L}_U$ where $U = \{u \in V : \exists\, e(v, u) \in E\}$ is the set of vertexes sharing an edge with $v$;
5:     $M \leftarrow M \cup F$;
6:     Update $E \leftarrow E \setminus F$
7:     Update $b(v) \leftarrow b(v) - b_F(v)$;
8:     if $b(v) = 0$ remove $v$ from $V$ and remove all edges incident to $v$ from E;
9:   end for
10: end while
11: return $M$;

FIGURE 5

SYSTEM AND METHOD OF MATCHING
CONTENT ITEMS AND CONSUMERS

FIELD OF THE DISCLOSURE

The present disclosure relates to matching items, e.g., content items, and consumers, and more particularly to efficiently matching items and consumers using a matching approach that uses capacity constraints associated with each consumer and item and relationship weights, each of which represents a similarity between a consumer and an item.

BACKGROUND

The last decade has witnessed a fundamental paradigm shift on how information content is distributed among people. Traditionally, the majority of information content has been produced by few specialized agents and consumed by the big masses. Nowadays, an increasing number of platforms allow everyone to participate both in information production and in information consumption. The phenomenon has been referred to as democratization of content. The Internet has had a major role in this paradigm shift. User-generated content and social media have also contributed to the paradigm shift. Blogs, micro-blogs, photo-sharing systems, and question-answering portals, are some of the social media that people participate in as both information suppliers and information consumers. The Internet, as well as social systems, offer significant opportunities for consumers to experience content and for suppliers to have an audience for content.

SUMMARY

In view of the vast number of consumers and the vast amount of available content, there is a need for a system that provides the ability to identify content for consumers and the ability to identify consumers as an audience for content in an efficient manner. A system is provided to allow consumers to locate content that is of interest to the consumers and to allow suppliers to identify an audience interested in their content. Embodiments of the present disclosure provide a system that efficiently identifies content items for consumers and an audience of consumers for a supplier's content.

In accordance with one or more embodiments, a method comprises obtaining, via at least one computing device, a plurality of edges incident to a plurality of vertexes of a graph, each edge representing a similarity relationship between a consumer of a plurality of consumers and an item of a plurality of items and having a weighting as a score of the similarity relationship between the consumer and the item, the plurality of consumers and the plurality of items being represented as vertexes in the graph; obtaining, via the at least one computing device a plurality of capacity constraints, a capacity constraint of the plurality that is associated with a consumer vertex being a constraint on selection of edges of the plurality of edges incident to the consumer vertex and a capacity constraint of the plurality that is associated with an item vertex being a constraint on selection of edges of the plurality of edges incident to the item vertex; and making, via the at least one computing device, a recommendation using selected edges from the plurality of edges, the selected edges being selected from the plurality of edges in accordance with the plurality of capacity constraints.

In accordance with one or more embodiments, a system is provided that comprises least one computing device comprising one or more processors to execute and memory to store instructions to obtain a plurality of edges incident to a plurality of vertexes of a graph, each edge representing a similarity relationship between a consumer of a plurality of consumers and an item of a plurality of items and having a weighting as a score of the similarity relationship between the consumer and the item, the plurality of consumers and the plurality of items being represented as vertexes in the graph; obtain a plurality of capacity constraints, a capacity constraint of the plurality that is associated with a consumer vertex being a constraint on selection of edges of the plurality of edges incident to the consumer vertex and a capacity constraint of the plurality that is associated with an item vertex being a constraint on selection of edges of the plurality of edges incident to the item vertex; and make a recommendation using selected edges from the plurality of edges, the selected edges being selected from the plurality of edges in accordance with the plurality of capacity constraints.

In accordance with one or more embodiments, a computer readable non-transitory storage medium is provided for tangibly storing thereon computer readable instructions that when executed cause at least one processor to obtain a plurality of edges incident to a plurality of vertexes of a graph, each edge representing a similarity relationship between a consumer of a plurality of consumers and an item of a plurality of items and having a weighting as a score of the similarity relationship between the consumer and the item, the plurality of consumers and the plurality of items being represented as vertexes in the graph; obtain a plurality of capacity constraints, a capacity constraint of the plurality that is associated with a consumer vertex being a constraint on selection of edges of the plurality of edges incident to the consumer vertex and a capacity constraint of the plurality that is associated with an item vertex being a constraint on selection of edges of the plurality of edges incident to the item vertex; and make a recommendation using selected edges from the plurality of edges, the selected edges being selected from the plurality of edges in accordance with the plurality of capacity constraints.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides a process overview in accordance with one or more embodiments of the present disclosure.

FIG. 2 provides a component overview in accordance with one or more embodiments of the present disclosure.

FIG. 3 provides edge selection pseudocode allowing for a capacity constraint violation in accordance with one or more embodiments of the present disclosure.

FIG. 4, which comprises FIGS. 4A and 4B, provide an example of a matching process flow in accordance with one or more embodiments of the present application.

FIG. 5 provides another example of edge selection pseudocode in accordance with one or more embodiments of the present disclosure.

DETAILED DESCRIPTION

Figure 1:
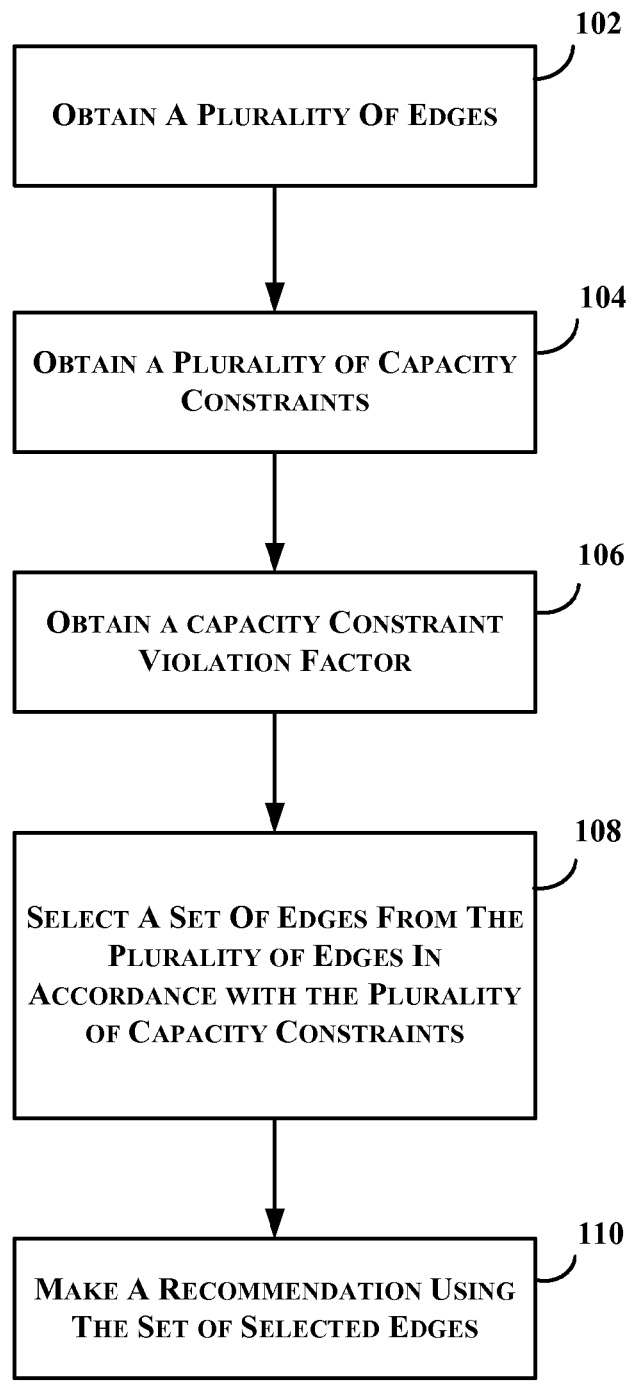

In general, the present disclosure includes a content item and consumer matching system, method and architecture.

Certain embodiments of the present disclosure will now be discussed with reference to the aforementioned figures, wherein like reference numerals refer to like components.

Items of content are used herein in connection with one or more embodiments described herein. Examples of content include without limitation images or photographs, audio, video, multimedia, streaming content, web pages, articles, documents, etc. Any item now known or discovered in the future is contemplated for use with one or more embodiments of the present disclosure.

FIG. 1 provides a process overview in accordance with one or more embodiments of the present disclosure. At step 102, a plurality of edges, e.g., a set E of edges, is obtained. In accordance with one or more embodiments, the set of edges are obtained in connection with a graph that comprises the edges and vertexes, each vertex corresponding to either a consumer or a content item. Each edge represents a relationship between a consumer and an item and has a weighting that represents a relationship score identifying a relevance between the consumer and the item. As is discussed in more detail below, the weighting can represent a determined similarity between the consumer and the item. By way of a non-limiting example, the similarity can be determined from information known about the consumer and the item.

At step 104, a capacity constraint is obtained for each consumer and item. By way of a non-limiting example, the consumer's capacity constraint can be determined using consumer activity, such as without limitation login activity, data accumulated for the consumer; and the item's capacity constraint can be determined using favorites and/or access data accumulated for the item. A capacity constraint for a consumer being used to constrain selection of edges incident to the consumer, and a capacity constraint for an item can be used to constrain selection of edges incident to the item. By way of some non-limiting examples, from the item perspective, capacity constraints associated with the items can be used so that each item has a viable opportunity of being selected and/or presented to a consumer; and from the consumer perspective, capacity constraints associated with the consumers can be used to limit the number of items presented to the consumer, e.g., to avoid overwhelming the consumer with item options. One or more embodiments of the present disclosure finds a consumer-item matches that satisfies the capacity constraints and maximizes the total weight of the edges.

In accordance with one or more embodiments, a certain degree of capacity constraint violation can be permitted. In accordance with one or more such embodiments, at step 106, a capacity constrain violation factor is obtained. The factor comprises a guideline for use in selecting edges, and specifies a permissible level or amount that a capacity constraint can be exceeded in selecting the edges. This step can be optionally performed in accordance with one or more embodiments.

At step 108, edges are selected from the edges obtained in step 102 in accordance with the capacity constraints. Where a capacity constraint violation factor is obtained, at step 106, the edge selection uses the capacity constraint violation factor that permits a certain amount of capacity constraint violation to occur, e.g., the edge selection can result in a permitted capacity constraint violation in accordance with the capacity constraint violation factor. The factor is expressed as $1+\epsilon$, where $\epsilon>0$. The factor can be variable, and can be determined heuristically. Additionally and in accordance with one or more embodiments, the edges are selected so as to maximize the weight of the edges in the resulting set of selected edges.

At step 110, the edges selected at step 108 can be used to make a recommendation. By way of a non-limiting example, a selected edge representing a relationship between a consumer and an item can be used to recommend the item to the consumer. By way of a further non-limiting example, one or more items can be presented to a consumer as a recommendation in response to the consumer requests or can be presented automatically without a request from the consumer, e.g., one or more selected items being presented to the consumer each time the consumer accesses a web page.

Figure 2:
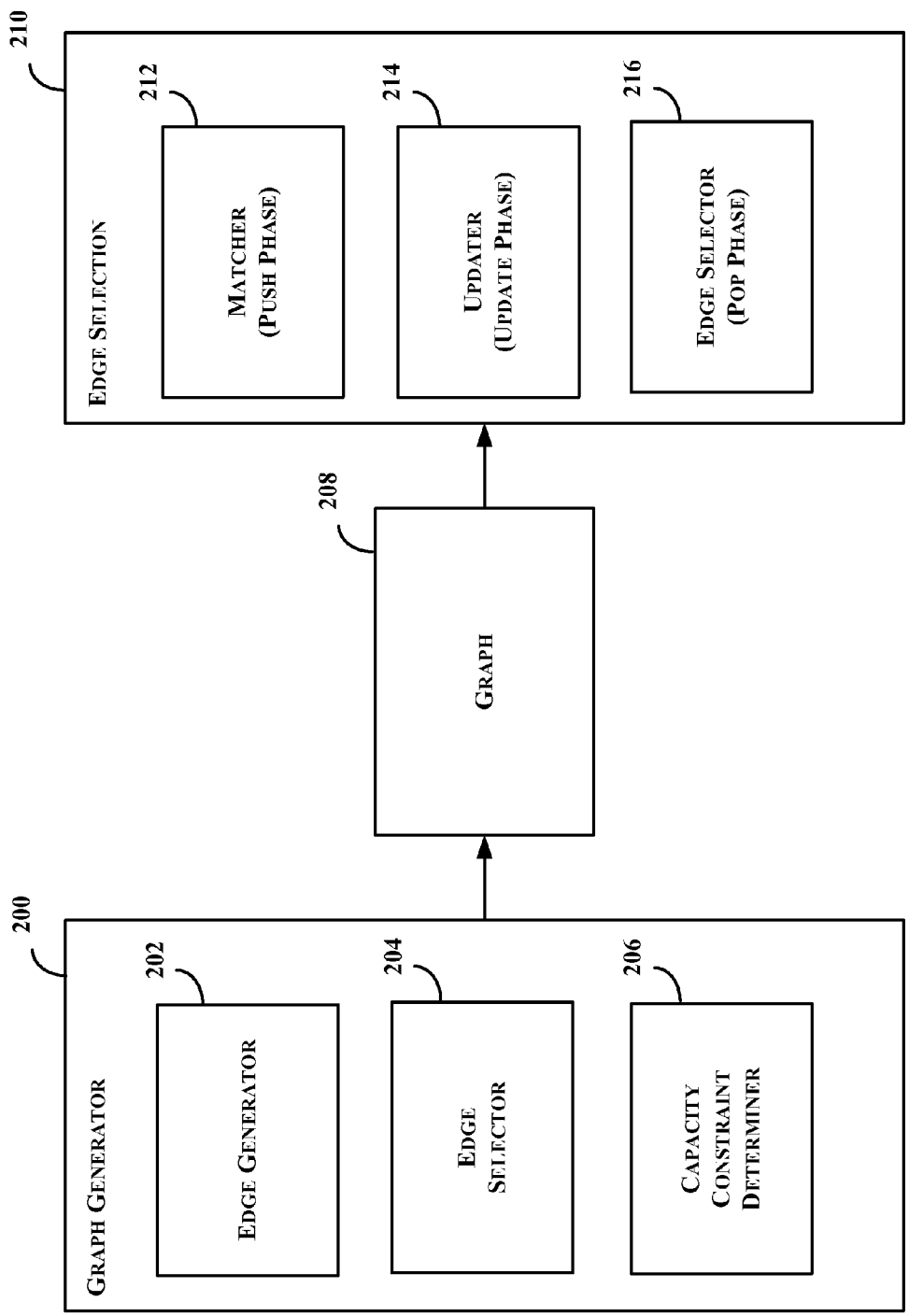

FIG. 2 provides a component overview in accordance with one or more embodiments of the present disclosure. In accordance with one or more such embodiments, an edge selection component 210 comprises a matcher 212 configured to match items and consumers, also referred to herein as users. The matcher 212 uses a graph 208, which comprises consumer vertexes, or nodes, content item vertexes, or nodes, and edges. Each edge relates a consumer vertex with an item vertex and has a weight, e.g., a determined relevance or similarity between the consumer and the item.

The edge selection component 210 selects a set of edges, each of which identifies a consumer and content item pairing. Each vertex has a capacity constraint for use by the edge selection component 210 in selecting the set of edges and/or in eliminating one or more edges or vertexes from consideration. The edge selection component 210 takes into account the capacity constraint violation factor, e.g., a predetermined amount, by which a capacity constraint can be violated.

In accordance with an exemplary embodiment shown in FIG. 2, the edge selection component 210 operates in push, update and pop phases. In the push phase, matcher 212 iteratively pushes a layer of edges onto a stack. In the update phase, updater 214 removes edges determined to be weakly covered from consideration by the matcher 212. In the pop phase, edge selector 216 pops a layer from the stack and adds the edges from the popped layer to set of selected edges. Additionally, during the pop phase, a vertex whose constraint capacity becomes non-positive is removed from consideration and each edge incident to a removed vertex is removed from the stack and from further consideration in the pop phase.

Graph generator 200 generates the graph 208. By way of one non-limiting example, graph 208 can be a unidirected graph, such as without limitation a unidirected bipartite graph. An edge generator 202 determines an associated weight of an edge. Graph generator 200 can include an edge selector 204, which determines whether or not to include an edge in graph 208. By way of a non-limiting example, a threshold, e.g., a predetermined number, can be used to determine whether or not the edge is included in graph 208. By way of a further non-limiting example, the weight associated with the edge is a determined relevance, or similarity, score for the consumer and the content item, and the edge selector 204 selects the edge for graph 208 where the determined score satisfies, e.g., is at least equal to, the threshold. By eliminating edges having associated weights that fail the threshold test, the edge selector 204 can be used to facilitate edge selection that maximizes edge weighting.

Alternatively, in accordance with one or more embodiments, each edge generated by edge generator 204 is included in graph 204. In such a case, the edge selector 204 need not be used and/or can be eliminated from graph generator 200.

For purposes of illustration and without limitation, the threshold can be used to reduce the size of graph 208, e.g., reduce the edges, to be processed by the matching component 212. In some cases, where the set of candidate edges is considered to be small in number, the edge selector 204 might not be needed. In another case, such as where any content item can be delivered to any user (e.g., a user in a photo-sharing service, such as Yahoo!™ Flickr™ may view a photo of any other user), the number of edges may be quite large. In accordance with one or more embodiments, in a case of larger set of candidate edges, the edge selector 204 can be used to identify and select those edges with an edge score, or weighting, greater than the threshold, thereby restricting matching to edges that satisfy the threshold score or weighting.

Graph generator 200 comprises a capacity constraint determiner 206, which determines a capacity constraint for each vertex included in graph 208. By way of a non-limiting example, given an item t and a user u, a constraint, or constraints, can be used to limit the maximum number of edges that t and u can participate in the matching. By way of a further non-limiting example, the capacity constraints can be estimated by the activity of each user and the relative frequency with which items need to be delivered. In accordance with one or more embodiments, a matching is found that satisfies all capacity constraints, at least by the predetermined factor, and maximizes the total weight of the edges in the matching.

In accordance with one or more embodiments, matching component 212 uses a b-matching approach to match consumers with candidate items of content, or conversely, to match items of content with candidate consumers. The b-matching uses graph 208. The b-matching algorithm takes as input a set of candidate edges weighted by their relevance scores, such as the edges and edge weightings defined in graph 208.

The following provides examples of some of the nomenclature used herein. A vertex is referred to herein using the letters u or v. A set of consumers is referred to as T, with a consumer in the set being referred to as t, and a set of items is referred to as C, with an item in the set C being referred to as c. A capacity constraint associated with a vertex v is referred to as $b(v)$. A weighting is referred to as w, with a weighting for a given consumer $t_i$ and item $c_j$ being referred to as $w(t_i, c_j)$. A set of input edges is referred to as E.

In accordance with one or more embodiments, matching component 212 identifies a set of edges, a solution set of edges, from the set of edges, E, identified in graph 208, such that for each vertex v in a union of a set of consumers, T, and set of content items, C, at most $b(v)$ edges incident to v are in the matching, the matching yields a maximum weighting. In accordance with one or more embodiments, weights $w(t_i, c_j)$ are defined between content items $t_i$ and consumers $c_j$, a set of potential edges participating in the matching are defined, and capacity constraints $b(t_i)$ and $b(c_j)$ are defined.

By way of a non-limiting example, edge weights can be determined as a result of the dot product of vectors in a vector space representing consumer, $c_j$, and item $t_i$ as term vectors. Using such approach, the edge weight $w(t_i, c_j)$ can be defined using the dot-product similarity $w(t_i, c_j) = v(t_i) \cdot v(c_j)$, where "·" represents a dot product operator. By way of a further non-limiting example, terms in the vector representation can be weighted with term frequency-inverse document frequency (tf-idf) scores. As another non-limiting example, the weights $w(t_i, c_j)$ can be output from a recommendation system that takes into account user preferences and user activities.

Continuing with some non-limiting examples, candidate edges, or edges to be considered for matching, can comprise all possible pairs $(t_i, c_j)$, and that the edge selection made by the matching algorithm processes the candidate edges. Alternatively, the number of candidate edges can be pruned or filtered, such as by considering as candidates those edges having a weight $w(t_i, c_j)$ that is above a threshold weighting value. Where the matching algorithm seeks to maximize the total edge weight, discarding edges with edge weights that fail to satisfy the threshold is consistent with the matching. As yet another non-limiting example, where consumers subscribe to suppliers, such as may be the case with a social-networking site, candidate edges $(t_i, c_j)$ might comprise candidate edges $(t_i, c_j)$ for which $t_i$ has been created by a producer to whom $c_j$ has subscribed.

In accordance with one or more embodiments, capacity constraints are determined for each consumer and each item. A capacity constraint, $b(c_j)$, can be determined to be the number of content items that are matched to a consumer, $c_j$. An item capacity constraint, $b(t_i)$, can be determined to be the number of consumers that each item $t_i$ is matched to. By way of some non-limiting examples, the consumer capacity constraints can be determined based on an estimated need of the consumer for content items, e.g., an estimated number of content items that might be displayed to a given consumer. For example, were a different content item is displayed to a consumer, $c_j$, each time the consumer accesses an application, web site's web page, etc., the consumer capacity, $b(c_j)$, can be set as an estimate of the number of times that the consumer is likely to make an access during a given period. Such an estimate can be obtained from log data, e.g., an estimate of the consumer's future access can be based on a number of previous accesses over a given period of time as determined using log data. Item capacity constraints can be determined using consumer capacity constraints. By way of a non-limiting example, an upper bound on a total number of distributed content items can be determined to be the sum of the consumer capacity constraints, or $B = \Sigma_{c \in C} b(c)$. At last two different cases might influence the item capacity determination, e.g., the case where there is a quality assessment on the items T, and the case where there is no quality assessment. Where there is no quality assessment, all content items are considered to be equivalent, and the total distribution, B, can be divided equally among all of the content items, e.g., $b(t) = \max\{1, B/|T|\}$, for all t in T.

Where there is a quality assessment on the items T, a quality assessment $q(t)$ is assumed for each item t in T. Such an estimate can be computed using a machine-learning approach, for example, which can involve assessing an item's quality using various features like content, links, reputation, etc., as input to a model to generate $q(t)$. In one exemplary non-limiting case, $q(t)$ can be normalized, such that $\Sigma_{t \in T} q(t) = 1$. In such as case, the total distribution bandwidth B can be divided among all content items in proportion to each item's quality score, e.g., $b(t) = \max\{1, q(t)B\}$. As yet a further non-limiting example, the function $q(t)$ can be controlled so that it satisfies certain properties, such as without limitation, it follows a power-law distribution.

Set of Candidate Edges

In accordance with one or more embodiments, each edge in the set of candidate edges, E, has a weight $w(t_i, c_j)$ that satisfies, e.g., is above, a threshold, e.g., a similarity threshold. A self-join technique that uses prefix filtering can be used to identify the edges that satisfy the threshold. By way of a non-limiting example, using the self-join technique, a pruned inverted index can be created on a set of documents and the documents are queried on the index. The pruning of the index is such that the similarity between document $d_i$ not retrieved during the querying of document $d_j$, can indicate that the similarity is below a similarity threshold. For each pair of documents returned in the querying phase, the self-join technique can assess the documents to verify that the similarity is indeed greater than the threshold. In accordance with one or more embodiments, to compute the candidate edges, the self-join algorithm is modified so that the items, $t_i$, and the consumers, $c_j$, are the documents, and the documents are represented by their vector representations. Additionally, the self-join algorithm can be modified to join the content item set, T, and the consumer set, C, without considering pairs between two items and two consumers.

Matching Using a Capacity Constraint Violation Factor

In accordance with one or more embodiments, a matching, e.g., the matching performed by matching component 212, is performed to identify edges, each of which matches, or pairs, a consumer and an item. In accordance with one or more embodiments, edges are selected to maximize an aggregate of the weights of the selected edges. An edge, e, incident to two vertexes u and v can be designated as e=(u, v). It is desirable to find a matching that satisfies capacity constraints and maximizes the total weight of the edges in the matching.

Embodiments of the present disclosure use capacity constraints placed on the consumer and item vertexes as a guideline, and permit a capacity violation where the violation is within a prescribed amount. In one or more such embodiments, a capacity constraint can be violated by a given factor, e.g., a factor of at most $1+\epsilon$, where $\epsilon>0$. This approach is in contrast to a matching approach that does not tolerate capacity violations and must ensure that capacity constraints are satisfied. In such an approach, the matching will not add an edge to the solution, or may tentatively add and then remove the edge, where the addition of the edge results in a capacity constraint violation. Where capacity violations are not permitted, an edge selection that would result in a capacity constraint violation is not allowed. Embodiments of the present disclosure allow capacity constraint violations, which results in efficiencies and allows for greater versatility in implementation, for example. In accordance with one or more embodiments, by tolerating some degree of capacity violations, matching can be performed using MapReduce. MapReduce is discussed in more detail below.

Generally, the matching performed in accordance with one or more embodiments operates on the set of edges, E, from the graph 208, which is also referred to herein as G. The set of edges E is examined to identify a solution set of edges. In accordance with one or more embodiments, matching examines the set of edges E in an iterative process in which edges can be pushed as a layer onto a stack during each push iteration. In accordance with one or more embodiments, the matching uses a maximal matching, e.g., maximal b-matching, to identify the edges to push onto the stack, as a layer of the stack, and the graph is updated to remove edges from E, as needed. The maximal matching and push phase are performed iteratively while the set E has edges, e.g., is not empty. During each iteration, the push phase builds the stack one layer at a time, each layer corresponding to one iteration of the push phase.

An iterative process can also be used to pop the layers of the stack and include edges from the popped layers in the solution, which identifies a set of edges from the candidate edge set E of graph G. During each iteration in the pop phase, a layer is popped from the stack, the edges are added to the solution. The iterations of the pop phase continue while layers of the stack remain to be popped from the stack. With each iteration of the pop phase, the capacity for a vertex is updated to reflect any edges of the vertex added to the solution, a determination is made whether or not a vertex's capacity is non-positive, which can occur where the vertex has reached or exceeded its capacity. Where the vertex's capacity is determined to be non-positive, edges incident to the vertex are removed from the stack and ignored in future iterations of the pop phase. In accordance with one or more embodiments of the disclosure, where a vertex has reached or exceeded its capacity with the addition of its edges to the solution during an iteration of the pop phase, the edges added to the solution in the iteration remain part of the solution; the vertex's edges that are added to the solution are not tentatively added to the solution and then removed when it is determined that a vertex's capacity is exceeded as a result of the addition of the edge in the solution. As discussed herein, in accordance with one or more embodiments, a vertex's capacity can be violated by a factor, e.g., a factor of $1+\epsilon$, where every layer contains at most $\epsilon b(v)$ edges incident to a vertex v and $\epsilon>0$.

Each edge contained in the solution represents a relationship between a consumer and an item. One or more edges contained in the solution set can be used to identify one or more items as recommendations for a given consumer.

Edge Selection and Permissible Capacity Constraint Violation

FIG. 3 provides edge selection pseudocode allowing for a capacity constraint violation in accordance with one or more embodiments of the present disclosure. The pseudocode implements a StackMR algorithm that permits a certain level of capacity constraint violation. In accordance with one or more such embodiments, capacity constraints can be violated by a factor of at most $1+\epsilon$, where $\epsilon>0$. In the example, each edge in E is incident, or connected, to a consumer vertex, which corresponds to a consumer, and an item vertex, which corresponds to an item.

In accordance with one or more embodiments, the push phase includes lines 2-8, and line 3 performs matching, e.g., maximal matching. In accordance with one or more such embodiments, the matching comprises four stages: marking, selection, matching and cleanup stages. In accordance with one or more embodiments, an iterative probabilistic algorithm is used, see O. Garrido, et al., *A simple randomized parallel algorithm for maximal f-matchings. IPL*, 57(2):83-87, 1996.

Figure 4A:
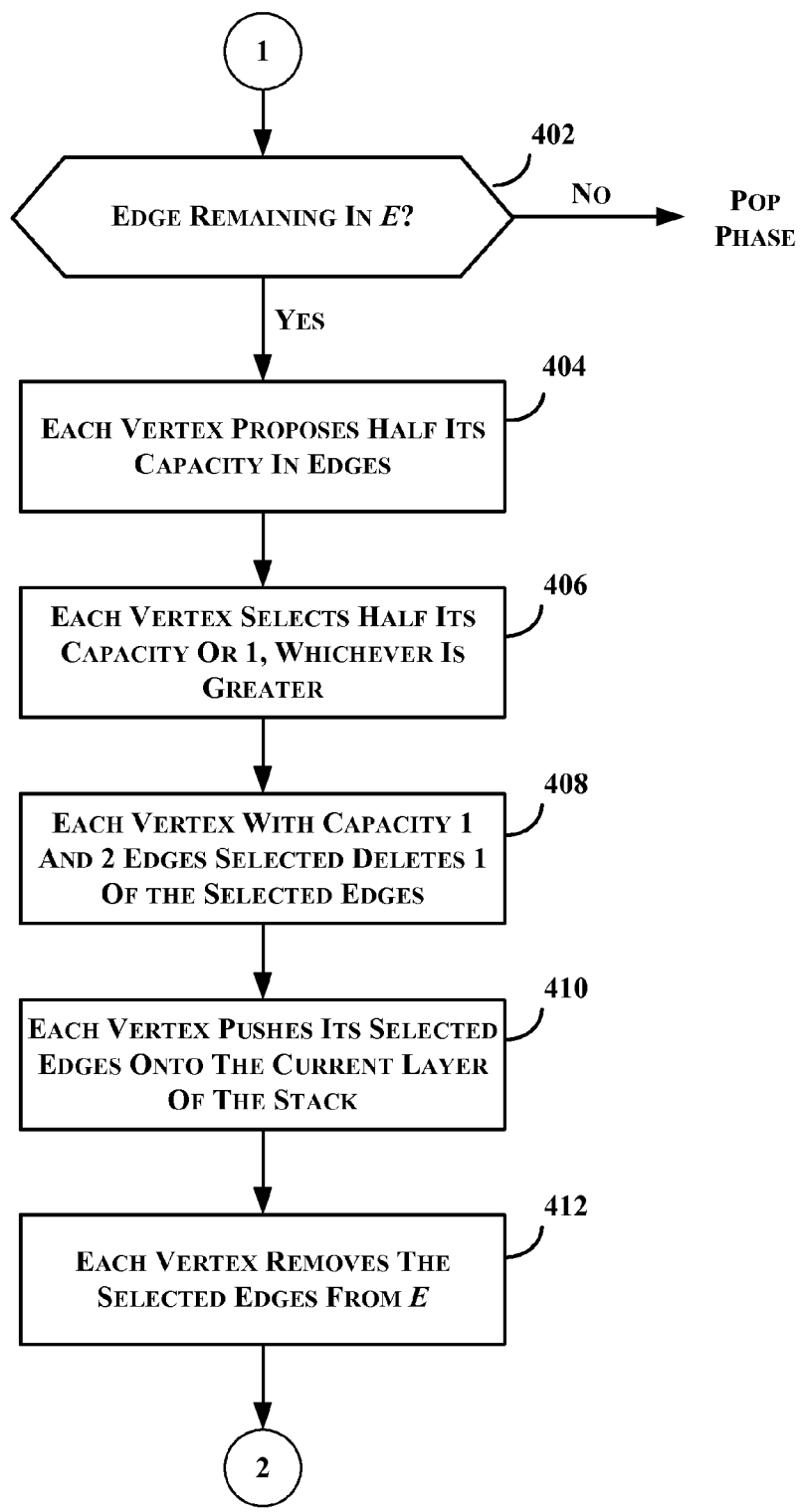
Figure 4B:
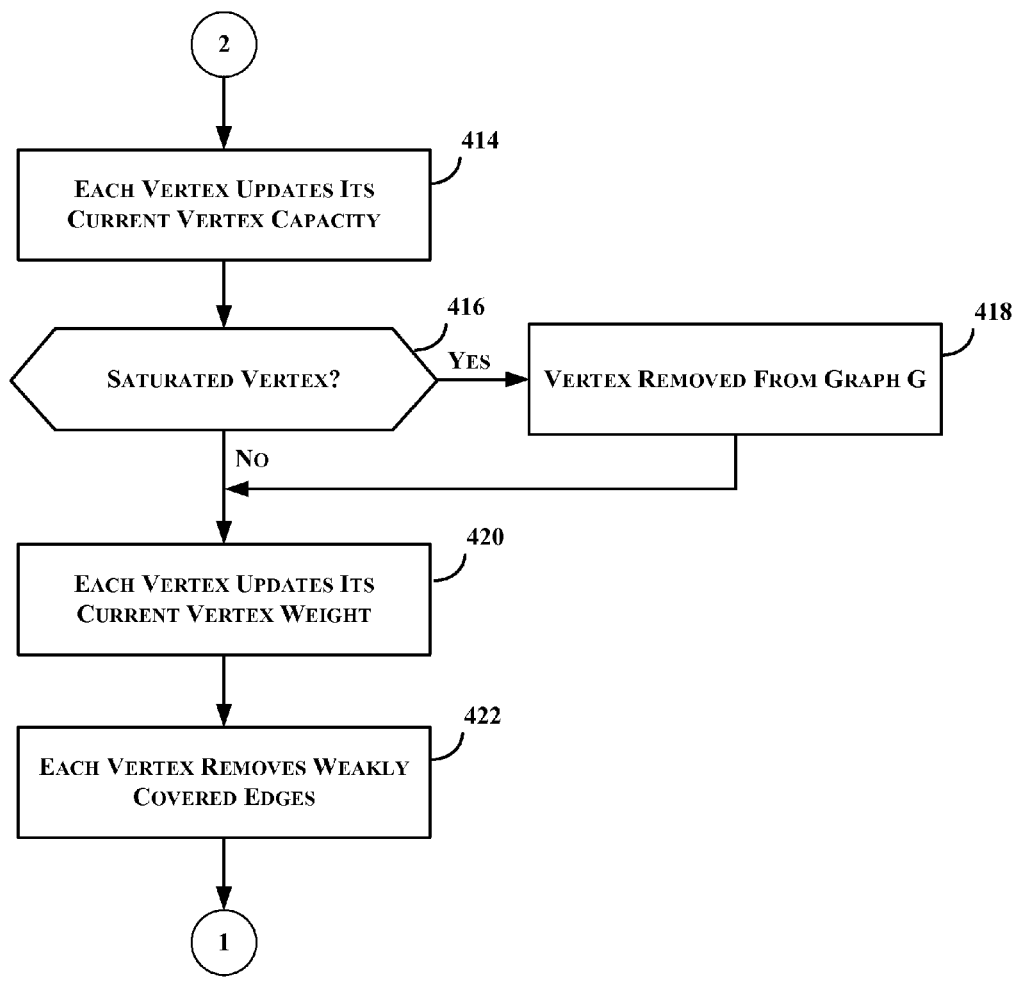

FIG. 4, which comprises FIGS. 4A and 4B, provide an example of a matching process flow in accordance with one or more embodiments of the present application. As is illustrated in FIG. 4, the maximal matching process can be performed in a distributed manner, so that each vertex performs its portion of the matching. The matching process continues iteratively while there are edges remaining to be processed. At step 402, a determination is made whether or not any edges remain to be processed. If not, processing continues by iteratively pop the stack, e.g., as part of the pop phase.

If it is determined, at step 402, that one or more edges remain to be processed, processing continues at step 404, with the marking stage. In the marking stage, at step 404, each vertex identifies and proposes to another vertex to which it shares an edge a number of edges incident to the vertex. In the selection phase, at step 406, each vertex selects a number of the edges proposed by the other vertex(es) for inclusion in M. In the matching phase, at step 408, where a vertex v has a capacity equal to 1, e.g., b(v)=1, and two incident edges were selected by the vertex v, e.g., two incident edges included in M, the vertex v randomly deletes one of them from M. At this point, the set M is a valid b-matching. The set M is added to the stack, e.g., as a layer of the stack, at step 410 of FIG. 4A and line 4 of FIG. 3, and the edges contained in set M are removed from the set of edges E, at step 412. In the cleanup phase, at steps 414, 416 and 418, each node updates its capacity to account for the edges in M and any saturated vertexes, e.g., a vertex whose updated capacity is less than or equal to zero, are removed from graph G.

Where an edge e becomes covered, it is deleted from the input graph, e.g., graph G. As discussed above, the push phase is terminated where no edge remains in the input graph. In accordance with one or more embodiments, a weakly covered edge can also be removed from graph G, and edge set E. In accordance with steps 420 and 422, which correspond to lines 5-9 of FIG. 3, each vertex updates its current vertex weight, $y_v$, and the current weights of the vertexes incident to an edge are used to identify whether or not the edge is weakly covered, and if so the weakly covered edge is removed from E.

In accordance with one or more embodiments, a vertex's weight is determined using a dual constraint associated with an incident edge. An edge is said to be covered if its corresponding dual constraint is satisfied with equality. As one non-limiting example, an edge's dual constraint can be expressed as follows:

$$\frac{y_u}{b(u)} + \frac{y_v}{b(v)} \geq w(e) \; \forall \, e = (u, v) \in E, \quad \text{Exp. (1)}$$

$$y_v \geq 0 \; \forall \, v = \in V. \quad \text{Exp. (2)}$$

where $y_u$ and $y_v$ are the vertex weights and b(u) and b(v) are the capacity constraints associated with the vertexes u and v incident to edge e. In the example, the capacity constraint for each vertex, $y_v$, is greater than or equal to zero for all vertexes in the set of vertexes, V. The dual constraint can be applied to each edge e=(u,v) that is a member of the set E, for example. When edge e is pushed on the stack, the vertex weights associated with the vertexes incident to edge e are each increased by the same amount, $\delta(e)$, to satisfy the above equation with equality. The value of $\delta(e)$ can be derived using Expression (1), and can be expressed as follows:

$$\delta(e) = \frac{\left(w(e) - \left(\frac{y_u}{b(u)}\right) - \left(\frac{y_v}{b(v)}\right)\right)}{2} \quad \text{Exp. (3)}$$

In accordance with one or more embodiments, a weakly covered edge is an edge whose dual constraint is only "partially satisfied" and thus gets covered after a few number of iterations. In accordance with one or more such embodiments, a weakly covered edge can be identified using a definition derived from the above expression of an edge's dual constraint. By way of a non-limiting example, where $\epsilon > 0$ and e=(u,v), the edge $e \in E$ can be said to be weakly covered if the edge's dual constraint is such that:

$$\frac{\bar{y}_u}{b(u)} + \frac{\bar{y}_v}{b(v)} \geq \frac{1}{3+2\varepsilon} w(e), \quad \text{Exp. (4)}$$

where $\bar{y}$ denotes the current value of the vertex weight value, y, e.g., vertex u or v; b(u) and b(v) are the capacity constraints of vertexes u and v; $\epsilon$ is a constant used in determining a degree to which a vertex capacity constraint violation is permitted; and w(e) is the weight assigned to the edge e. According to Expression (4), the higher the edge's weight, the later the weakly-covered condition is likely to occur in connection with the edge. Conversely, the lower the edge's weight, the sooner the edge is likely to be considered to be weakly covered.

In accordance with one or more embodiments, the current value of the vertex weight variable, $\bar{y}$, is initialized, e.g., initialized to a value of zero, and in each iteration of the push phase, any edge, e, can be examined to determine whether or not the edge is weakly covered. The weight variable, $\bar{y}$, for each vertex incident to a selected edge is increased by $\delta(e)$ to update $\bar{y}$ as the current value of y. By way of a non-limiting example, the weakly covered determination is made for each unselected edge using the current weight variables, $\bar{y}_u$ and $\bar{y}_v$, and the capacity constraints, b(u) and b(v), for vertexes u and v incident to the unselected edge. If $(\bar{y}_u/b(u)+\bar{y}_v/b(v))$ is determined to be equal to or greater than $(1/(3+2\epsilon))w(e)$, the unselected edge is removed from the set of edges E, e.g., prior to the start of the next iteration of the push phase. In so doing, it is possible to minimize the possibility that the total number of layers become linear in the maximum degree of the vertex.

During each iteration of the push phase, a determination can be made whether or not an edge is weakly covered. Where an edge is determined to be weakly covered, the edge is removed from the set E.

Referring again to FIG. 3, lines 12-16 are included in the pop phase. As indicated by lines 12 and 16, the pop phase continues while the stack is nonempty. In each iteration of the pop phase, a layer M of the stack is popped from the stack (line 13), and the edges of M are added to the solution (line 14). As with the push phase, the processing can be distributed such that each vertex pops its edges from the current layer M of the stack and adds its edges to the solution. Each vertex, v, updates its capacity, b(v) by a value $\bar{b}(v)$, e.g., b(v)←b(v)−$\bar{b}(v)$. A determination is made whether the resulting value of b(v) is non-positive, e.g., less than or equal to zero. If so, edges incident to vertex v that remain on the stack are removed from the stack for purposes of any remaining iterations of the pop phase.

As discussed herein, a capacity violation is allowed by a factor of 1+$\epsilon$, where $\epsilon > 0$. Where capacity violations are not permitted, overflow edges that occur are examined in an overflow edge processing such as that described in an article by A. Panconesi and M. Sozio, *Fast primal-dual distributed algorithms for scheduling and matching problems*, Distributed Computing, 22(4):269-283, 2010. Advantageously and in accordance with one or more embodiments of the present disclosure, overflow edges need not identified or examined; and there is no need to perform additional processing subsequent to the pop phase processing. In accordance with one or more embodiments, the solution set of edges are identified in the pop phase processing.

MapReduce

Embodiments of the present application implement the pseudocode of FIG. 3 using MapReduce. MapReduce is a distributed computing paradigm based on two higher-order functions: map and reduce. The map function applies a user-defined function to each key-value pair in the input. The result is a list of intermediate key-value pairs, sorted and grouped by key, and passed as input to the reduce function. The reduce function applies a second user-defined function to every intermediate key and all its associated values, and produces the final result. The two phases of MapReduce computation can be expressed as follows:

$$\text{map: } <k_1, v_1> \to [<k_2, v_2>] \quad \text{Exp. (5)}$$

$$\text{reduce: } <k_2, [v_2]> \to [<k_3, v_3>] \quad \text{Exp. (6)}$$

MapReduce can use a distributed file system from which the map instances retrieve the input. The framework takes care of moving, grouping, and sorting the intermediate data. This phase is called shuffle. Hadoop is one example of an open-source implementation of MapReduce that can be used.

In accordance with one or more embodiments, one MapReduce job is used for each stage of maximal matching. The input and output of each MapReduce job has the same format and yields a consistent view of the graph represented as adjacency lists. By way of one non-limiting example, a "node-based", or "vertex-based", representation of the graph is maintained in order to make decisions based on the local neighborhood of each vertex, or node. Assuming the set of vertexes adjacent to $v_i$ is $\{v_j, \ldots, v_k\}$, the input and output of each job is a list $\langle v_i, [(v_j, T_j), \ldots, (v_k, T_k)]\rangle$, where $v_i$ is the key and $[(v_j, T_j); :::; (v_k, T_k)]$ is the associated value. The variables T represent the state of each edge. Examples of possible states of an edge include: E indicating that the edge remains in the main graph; K indicating that the edge is marked, or proposed by a vertex; F indicating that the edge is selected by a vertex; D indicating that the edge is deleted from the main graph; and M indicating that the edge is in the matching. Each map function performs the decisions altering the state of the graph locally to each vertex. Each reduce function unifies the diverging views of the graph at each vertex. For each edge ($v_i$, $v_j$), each map function will output both $\langle v_i \rangle$ and $\langle v_j \rangle$ as keys, together with the current state of the edge as the value. The reduce function will receive the views of the state of the edge from both end-points, and will unify them, yielding a consistent graph representation as output. Each MapReduce job uses the same communication pattern and state unification rules, but can differ in the way they update the state of the edges.

In accordance with one or more embodiments, the communication scheme for the push, update, and pop phases is the same as the one used in maximal-matching. For push, update and pop phases of the algorithm, a separate state is maintained for each edge. Examples of possible states of an edge include: E, indicating that the edge is in the graph (default); S, indicating that the edge stacked; R, indicating that the edge has been removed from the graph; and I, indicating that the edge is included in the solution. For each edge, an integer variable is maintained that represents the stack level in which the edge has been put. During the push phase, for each edge included in the maximal matching, its state is set to S and the corresponding stack level. The update phase is used to propagate the δ(e) contributions. Each edge sent to a vertex v carries the value of its sending vertex $y_u/b(u)$, where u is the sending vertex. Thus, each vertex receives the value from the sending vertex and can compute the new δ(e) and update its local value of y, e.g., $y_v$, where v is the receiving vertex. During the update phase, weakly covered edges are removed by setting their state to R, and the capacities of the vertexes are updated for the next iteration of the maximal-matching phase. Removed edges need not considered for the next iteration of the maximal-matching phase. When all the edges in the graph are either stacked (S) or removed (R), the pop phase starts. During the pop phase, each stacked (S) edge in the current level (starting from the topmost layer) is included in the solution by setting its state to (I). The capacities are locally updated, and a vertex (and all incident edges) is removed when its capacity is less than or equal to zero.

Alternate Edge Selection Approach

Embodiments of the present disclosure contemplate one or more alternate edge selection approaches. The approach discussed above with reference to FIGS. 3 and 4, which is referred to herein as StackMR with permissible capacity constraint violation, can perform in a poly-logarithmic number of iterations, e.g., the number of map-reduce rounds used in determining the solution set of edges is bounded by a poly-logarithmic function of the size of the input data. The following approach, referred to herein as GreedyMR, may not finish in a polylogarithmic number of iterations. Advantageously, GreedyMR maintains a feasible solution at each step, and can be terminated at any step and return the current solution. Consequently, content can be delivered to the users almost immediately even while GreedyMR continues processing, e.g., running in the background.

GreedMR is based on a greedy strategy. In accordance with one or more embodiments, a centralized greedy algorithm performs by processing sequentially each edge in order of decreasing weight. It includes an edge e(u; v) in the solution if b(u)>0 and b(v)>0. Where the edge is added to the solution, a value of one is subtracted from the capacities, b(u) and b(v), of the vertexes incident to the edge. As with the StackMR approach, the centralized approach can be implemented using MapReduce.

FIG. 5 provides pseudocode of GreedyMR in accordance with one or more embodiments of the present disclosure. The pseudocode shown in FIG. 5 processes edges in the candidate set of edges, E, while the set is non empty. In accordance with lines 2 and 3, each vector v in a set of vectors, V, e.g., the vectors in graph 208, proposes a set of edges, $\hat{L}_v$, incident to the vertex, v, to its neighboring vertexes, e.g., vertexes that share an edge with the vertex. The number of edges proposed by the vertex being equal to the vertex's capacity, b(v), and having the maximum weight relative to the weights of the edges incident to v. Each vertex computes the intersection between its own proposal and the proposals of its neighbors, as shown in line 4. In accordance with one or more embodiments, the resulting set F for vertex v is the intersection of the set of edges proposed by v, $\hat{L}_v$, and the set of proposed edges, $\hat{L}_U$, where U is the set of vertexes sharing an edge with v. At lines 5 to 7, each vertex includes the set of edges, F, in the solution, removes the edges in the set of edges, F, from E, and updates its capacity, b(v), e.g., by reducing its capacity by the number of edges added to the solution. At line 8, a determination is made whether or not the vertex's capacity, b(v), is equal to 0. Where a vertex's constraint capacity is equal to 0, the vertex is removed from the processing, and the edges incident to the vertex are removed from the candidate set of edges, E.

The GreedyMR pseudocode shown in FIG. 5 can be implemented using MapReduce. In the map phase each vertex v proposes its capacity, b(v), in edges to its neighbors. The vertex selects the edges with the highest weight, e.g., the edges selected have the maximum weight relative to the other edges incident to the vertex. In the reduce phase, each vertex computes the intersection between its own proposals and the proposals of its neighbors. The set of edges in the intersection is included in the solution. Then, each vertex updates its capacity. If it becomes 0, the node is removed from the graph.

NON-LIMITING EXAMPLES

The following provides two non-limiting applications using functionality in connection with one or more embodiments of the present disclosure. It should be apparent that the applications are illustrative and that embodiments of the present disclosure are not limited to these two applications.

By way of one non-limiting example, an item comprises content that can be shared between users via a content sharing web site, e.g., a photo sharing site such as without limitation Yahoo!™ Flickr™, and the content items can be photographs, e.g., digital photographs or images. It should be apparent that any type of item can be substituted, including without limitation content items such as video, audio, slides, streaming media, streaming multimedia, etc. The content items can be supplied by a content provider, such as a site user, or any other content provider; and the site users can be the consumers, e.g., the users that access the content sharing site. As discussed herein, the capacity of each user, b(u) can be determined based on login activity of the user with the site, e.g., set in proportion to the login activity of the user. Where login activity is unavailable, a proxy can be used. By way of one non-limiting example, a proxy can be the number of photos, n(u), that the user u has posted. A parameter $\alpha > 0$ can be used to determine the capacity of each user u as $b(u) = \alpha n(u)$., where higher values of the parameter $\alpha$ simulate higher levels of activity in the system.

By way of further illustration and without limitation, the capacity for the content item, e.g., a photo, can be specified using a proxy, such as the number of favorites, f(p), that each photo p has received. This approach favors good photos, which is likely to increase user satisfaction. The following provides a non-limiting example expression to set the capacity of a photo:

$$b(p) = f(p) \frac{\sum_u \alpha n(u)}{\sum_q f(q)}$$ Exp. (7)

In order to estimate edge similarities, each photo can be represented by its tags and/or metadata, and each user by the set of all tags that the user has used, and/or metadata associated with the user. The similarity between a photo and a user can be determined to be the dot product of the tag vectors. Edges having a determined similarity satisfying a similarity threshold can be included in the graph and processed, e.g., processed using StackMR or GreedMR, which can be implemented using MapReduce.

Another exemplary application relates to posts, such as without limitation posts made to Yahoo! Answers™, as content items. In the example, the items represent questions, and functionality described herein can be used to propose unanswered questions to users as the consumers. Other types of posts are also contemplated, including without limitation blog and/or microblog posts, social networking posts, etc.

Matched questions are identified that "fit" the user interests. To identify user interests, users can be represented by a weighted set of words found in their answers. The answers can be preprocessed to remove punctuation and stop-words, identify stem words, and apply tf-idf weighting. Questions can be processed in a similar manner. A graph is generated with edge weights representing the similarity between questions and users. A similarity threshold can be used to eliminate edges, e.g., similarity relationships between the users and the questions, which fail to satisfy the threshold. User capacity, b(u), can be set by employing the number of answers n(u) provided by the user u as a proxy to the activity of the user. The parameter, $\alpha$, can be used to determine a capacity constraint, e.g., $b(u) = \alpha n(u)$. For each question q, the capacity, b(q), can be determined as follows:

$$b(q) = \frac{\sum_u \alpha n(u)}{|Q|},$$ Exp. (7)

where |Q| represents the number of questions in a set of questions. Alternatively, a constant capacity can be used for all questions.

Figure 6:
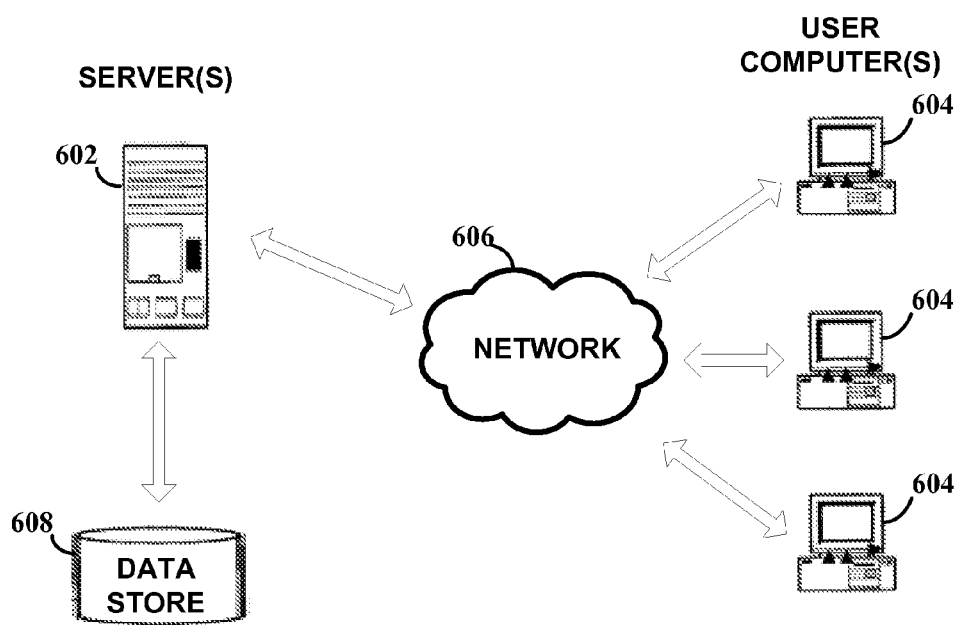
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 602 can be configured to execute program code, instructions, etc. to provide functionality in accordance with one or more embodiments of the present disclosure.

Computing device 602 can serve content to user computing devices 604 using a browser application via a network 606. Data store 608 can be used to store data and/or program code to configure a server 602 to execute functionality described in connection with one or more embodiments of the present disclosure.

The user computing device 604 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware.

In accordance with one or more embodiments, a computing device 602 can make a user interface available to a user computing device 604 via the network 606. The user interface made available to the user computing device 604 can include content items, or identifiers (e.g., URLs) selected for the user interface in accordance with one or more embodiments of the present invention. In accordance with one or more embodiments, computing device 602 makes a user interface available to a user computing device 604 by communicating a definition of the user interface to the user computing device 604 via the network 606. The user interface definition can be specified using any of a number of languages, including without limitation a markup language such as Hypertext Markup Language, scripts, applets and the like. The user interface definition can be processed by an application executing on the user computing device 604, such as a browser application, to output the user interface on a display coupled, e.g., a display directly or indirectly connected, to the user computing device 604.

In an embodiment the network 606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 6. Alternatively, embodiments of the present disclosure can be implemented other environments, e.g., a peer-to-peer environment as one non-limiting example.

Figure 7:
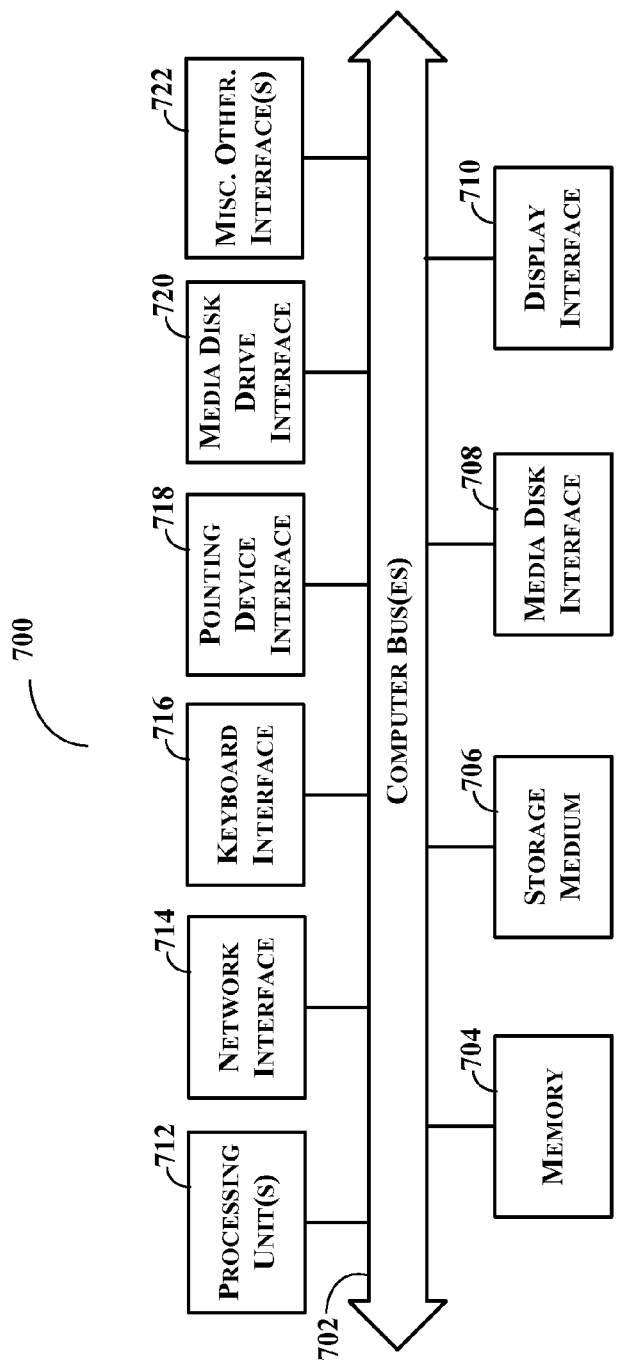
FIG. 7 is a detailed block diagram illustrating an internal architecture of a computing device in accordance with one or more embodiments of the present disclosure.

FIG. 7 is a detailed block diagram illustrating an internal architecture of a computing device, e.g., a computing device such as server 602 or user computing device 604, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
obtaining, via at least one computing device, a plurality of edges incident to a plurality of vertexes of a graph, each edge representing a similarity relationship between a consumer of a plurality of consumers and an item of a plurality of items and having a weighting as a score of the similarity relationship between the consumer and the item, the plurality of consumers and the plurality of items being represented as vertexes in the graph;
obtaining, via the at least one computing device, a plurality of capacity constraints, a capacity constraint of the plurality that is associated with a consumer vertex being a constraint on selection of edges of the plurality of edges incident to the consumer vertex and a capacity constraint of the plurality that is associated with an item vertex being a constraint on selection of edges of the plurality of edges incident to the item vertex; and making, via the at least one computing device, a recommendation using selected edges from the plurality of edges, the selected edges being selected from the plurality of edges in accordance with the plurality of capacity constraints.

2. The method of claim 1, further comprising:
obtaining, via the at least one computing device, a capacity constraint violation factor, the factor identifying a permissible capacity constraint violation;
the selected edges being selected using the capacity constraint violation factor that permits a capacity constraint violation to occur.

3. The method of claim 2, selection of at least one edge resulting in a permitted capacity constraint violation, the permitted capacity constraint violation being in accordance with the capacity constraint violation factor.

4. The method of claim 1, the recommendation comprising a set of items selected from the plurality of items for the consumer, each item in the set of items selected corresponding to an item vertex incident to a selected edge.

5. The method of claim 1, the selected edges being selected from the plurality of edges in accordance with the plurality of capacity constraints and the score of the similarity relationship between the consumer and the item.

6. The method of claim 5, wherein the selected edges result in a maximum score of the similarity relationship between the consumer and the item relative to scores corresponding to unselected edges.

7. The method of claim 1, the selected edges being selected using a MapReduce architecture.

8. A system comprising:
at least one computing device comprising one or more processors to execute and memory to store instructions to:
obtain a plurality of edges incident to a plurality of vertexes of a graph, each edge representing a similarity relationship between a consumer of a plurality of consumers and an item of a plurality of items and having a weighting as a score of the similarity relationship between the consumer and the item, the plurality of consumers and the plurality of items being represented as vertexes in the graph;
obtain a plurality of capacity constraints, a capacity constraint of the plurality that is associated with a consumer vertex being a constraint on selection of edges of the plurality of edges incident to the consumer vertex and a capacity constraint of the plurality that is associated with an item vertex being a constraint on selection of edges of the plurality of edges incident to the item vertex; and
make a recommendation using selected edges from the plurality of edges, the selected edges being selected from the plurality of edges in accordance with the plurality of capacity constraints.

9. The system of claim 8, the instructions further comprising instructions to:
obtain a capacity constraint violation factor, the factor identifying a permissible capacity constraint violation;
the selected edges being selected using the capacity constraint violation factor that permits a capacity constraint violation to occur.

10. The system of claim 9, selection of at least one edge resulting in a permitted capacity constraint violation, the permitted capacity constraint violation being in accordance with the capacity constraint violation factor.

11. The system of claim 8, the recommendation comprising a set of items selected from the plurality of items for the consumer, each item in the set of items selected corresponding to an item vertex incident to a selected edge.

12. The system of claim 8, the selected edges being selected from the plurality of edges in accordance with the plurality of capacity constraints and the score of the similarity relationship between the consumer and the item.

13. The system of claim 12, wherein the selected edges result in a maximum score of the similarity relationship between the consumer and the item relative to scores corresponding to unselected edges.

14. The system of claim 8, the selected edges being selected using a MapReduce architecture.

15. A computer readable non-transitory storage medium for tangibly storing thereon computer readable instructions that when executed cause at least one processor to:
obtain a plurality of edges incident to a plurality of vertexes of a graph, each edge representing a similarity relationship between a consumer of a plurality of consumers and an item of a plurality of items and having a weighting as a score of the similarity relationship between the consumer and the item, the plurality of consumers and the plurality of items being represented as vertexes in the graph;
obtain a plurality of capacity constraints, a capacity constraint of the plurality that is associated with a consumer vertex being a constraint on selection of edges of the plurality of edges incident to the consumer vertex and a capacity constraint of the plurality that is associated with an item vertex being a constraint on selection of edges of the plurality of edges incident to the item vertex; and
make a recommendation using selected edges from the plurality of edges, the selected edges being selected from the plurality of edges in accordance with the plurality of capacity constraints.

16. The medium of claim 15, the instructions further comprising instructions to:
obtain a capacity constraint violation factor, the factor identifying a permissible capacity constraint violation;
the selected edges being selected using the capacity constraint violation factor that permits a capacity constraint violation to occur.

17. The medium of claim 16, selection of at least one edge resulting in a permitted capacity constraint violation, the permitted capacity constraint violation being in accordance with the capacity constraint violation factor.

18. The medium of claim 15, the recommendation comprising a set of items selected from the plurality of items for the consumer, each item in the set of items selected corresponding to an item vertex incident to a selected edge.

19. The medium of claim 15, the selected edges being selected from the plurality of edges in accordance with the plurality of capacity constraints and the score of the similarity relationship between the consumer and the item.

20. The medium of claim 19, wherein the selected edges result in a maximum score of the similarity relationship between the consumer and the item relative to scores corresponding to unselected edges.

21. The medium of claim 15, the selected edges being selected using a MapReduce architecture.

* * * * *